United States Patent
Feng et al.

(10) Patent No.: US 7,793,900 B2
(45) Date of Patent: Sep. 14, 2010

(54) MAGNETIC CLAMP HOLDER

(75) Inventors: Han Feng, Shenzhen (CN); Chun Li, Shenzhen (CN); Xiao-Yu Ma, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 445 days.

(21) Appl. No.: 11/946,852

(22) Filed: Nov. 29, 2007

(65) Prior Publication Data

US 2008/0315055 A1 Dec. 25, 2008

(30) Foreign Application Priority Data

Jun. 20, 2007 (CN) .................. 2007 1 0200838

(51) Int. Cl.
*A47G 1/17* (2006.01)
(52) U.S. Cl. ............... 248/206.5; 248/683; 248/309.4; 335/289; 335/290; 335/291; 335/292; 335/293; 335/294; 335/295; 269/8
(58) Field of Classification Search .............. 248/206.5, 248/683, 309.4; 269/8; 335/289–295
See application file for complete search history.

(56) References Cited

U.S. PATENT DOCUMENTS

| | | | | |
|---|---|---|---|---|
| 2,117,132 A | * | 5/1938 | Baermann, Jr | 335/295 |
| 3,336,551 A | * | 8/1967 | Stead | 335/295 |
| 3,854,711 A | * | 12/1974 | Dong | 269/8 |
| 4,075,589 A | * | 2/1978 | Braillon | 335/286 |
| 4,541,155 A | * | 9/1985 | Gagnon | 24/486 |
| 5,114,195 A | * | 5/1992 | Martin et al. | 292/251.5 |
| 6,264,055 B1 | * | 7/2001 | Dozier | 220/483 |
| 6,462,927 B2 | * | 10/2002 | Swinbanks | 361/146 |
| 6,729,234 B2 | * | 5/2004 | Shih | 101/389.1 |
| 6,729,235 B2 | * | 5/2004 | Kerr | 101/415.1 |
| 2006/0196737 A1 | * | 9/2006 | Swoffer | 188/67 |
| 2006/0210412 A1 | * | 9/2006 | Lawyer et al. | 417/420 |
| 2007/0131829 A1 | * | 6/2007 | Thompson | 248/206.5 |

* cited by examiner

*Primary Examiner*—J. Allen Shriver, II
*Assistant Examiner*—Michael McDuffie
(74) *Attorney, Agent, or Firm*—Frank R. Niranjan

(57) ABSTRACT

An exemplary magnetic clamp holder used for a mechanical arm, includes a housing (21), a magnetic structure (22), and two positioning pins (25). The housing includes an attaching portion (211), and a joining portion (213) fixed to the attaching portion, the attaching portion and the joining portion cooperatively defining a receiving cavity (218). The positioning pins are disposed on the attaching portion of the housing. The magnetic structure is received in the receiving cavity. The magnetic structure includes a permanent magnetic module (223), an electro-magnetic module (225), and a magnetic shield plate (227) disposed between the permanent magnetic module and the electro-magnetic module. The electro-magnetic module is able to create a magnetic field for neutralizing a magnetic field created by the permanent magnetic module.

11 Claims, 6 Drawing Sheets

MAGNETIC CLAMP HOLDER

BACKGROUND OF THE INVENTION

1. Field of the Invention

The present invention generally relates to clamp holders, and more particularly, to a magnetic clamp holder used for a mechanical arm.

2. Discussion of the Related Art

A mechanical arm generally includes a clamp holder for holding a clamping device that is mounted with one or more workpieces. The structure of the clamp holder will directly affect a positioning precision of the mechanical arm. Referring to FIG. 6, a clamp holder 10 used for a mechanical arm is shown. The clamp holder 10 includes two rotatable cylinders 11, a supporting element 13, two guiding elements 15, a plurality of ball bearings (not shown), and two positioning elements 17. The rotatable cylinders 11 are disposed at opposite ends of one side of the supporting element 13. The guiding elements 15 are disposed on the side opposite to the rotatable cylinders 11 and are positioned at opposite ends of the side, similar to the rotatable cylinders. The positioning elements 17 are assembled corresponding to the guiding elements 15. Each of the guiding elements 15 and each of the positioning elements 17 cooperatively define a clamp hole 19. The ball bearings are disposed between the guiding elements 15 and the positioning elements 17, and the ball bearings evenly surround each of the clamp holes 19.

In use, when a workpiece (not shown) is to be moved, the workpiece is fixed to a clamping device (not shown). The clamp holder 10 is placed above the clamping device. The rotatable cylinders 11 of the clamp holder 10 are rotated so that the clamp holes 19 positioning aim at positioning poles of the clamping device. Then, the clamp holder 10 is moved down to the clamping device, and the clamp holes 19 of the clamp holder 10 engage with the positioning poles of the clamping device. The ball bearings are driven to clamp the positioning poles of the clamping device by gas injected from the rotatable cylinders 11. The workpiece with the clamping device can be moved to a determined position (for example, a platform of a machine) with a help of the clamp holder 10. When the ball bearings are applied to stop clamping the positioning poles of the clamping device, the workpiece with the clamping device can be detached from the clamp holder 10 and disposed at the determined position.

However, an positioning precision of the clamp holder 10 is in the range of ±0.1 mm. Therefore, the positioning precision of the clamp holder 10 is relatively low and can not be used for a higher precision manufacturing. In addition, the ball bearings, the guiding elements 15, and the positioning elements 17 are easily abraded in the process of clamping the positioning poles of the clamping device, thus the positioning precision will be decreased easily.

Therefore, a new clamp holder is desired in order to overcome the above-described shortcomings.

SUMMARY

In one aspect, a magnetic clamp holder used for a mechanical arm, includes a housing, a magnetic structure, and two positioning pins. The housing includes an attaching portion, and a joining portion fixed to the attaching portion. The attaching portion and the joining portion cooperatively define a receiving cavity. The positioning pins are disposed on the attaching portion of the housing. The magnetic structure is received in the receiving cavity. The magnetic structure includes a permanent magnetic module, an electro-magnetic module, and a magnetic shield plate disposed between the permanent magnetic module and the electro-magnetic module. The electro-magnetic module is able to create a magnetic field for neutralizing a magnetic field of the permanent magnetic module.

In another aspect, a magnetic clamp holder used for a mechanical arm, includes a housing and a magnetic structure. The housing includes an attaching portion, and a joining portion fixed to the attaching portion. A first end of the attaching portion and the joining portion cooperatively define a receiving cavity, and an opposite second end of the attaching portion defining a guiding groove. The magnetic structure is received in the receiving cavity. The magnetic structure includes a permanent magnetic module, an electro-magnetic module, and a magnetic shield plate disposed between the permanent magnetic module and the electro-magnetic module. The electro-magnetic module is able to create a magnetic field for neutralizing a magnetic field of the permanent magnetic module.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present magnetic clamp holder. Moreover, in the drawings, like reference numerals designate corresponding parts throughout the several views, and all the views are schematic.

DETAILED DESCRIPTION OF THE EMBODIMENTS

Reference will now be made to the drawings to describe preferred embodiments of the present magnetic clamp holder in detail.

Figure 1:
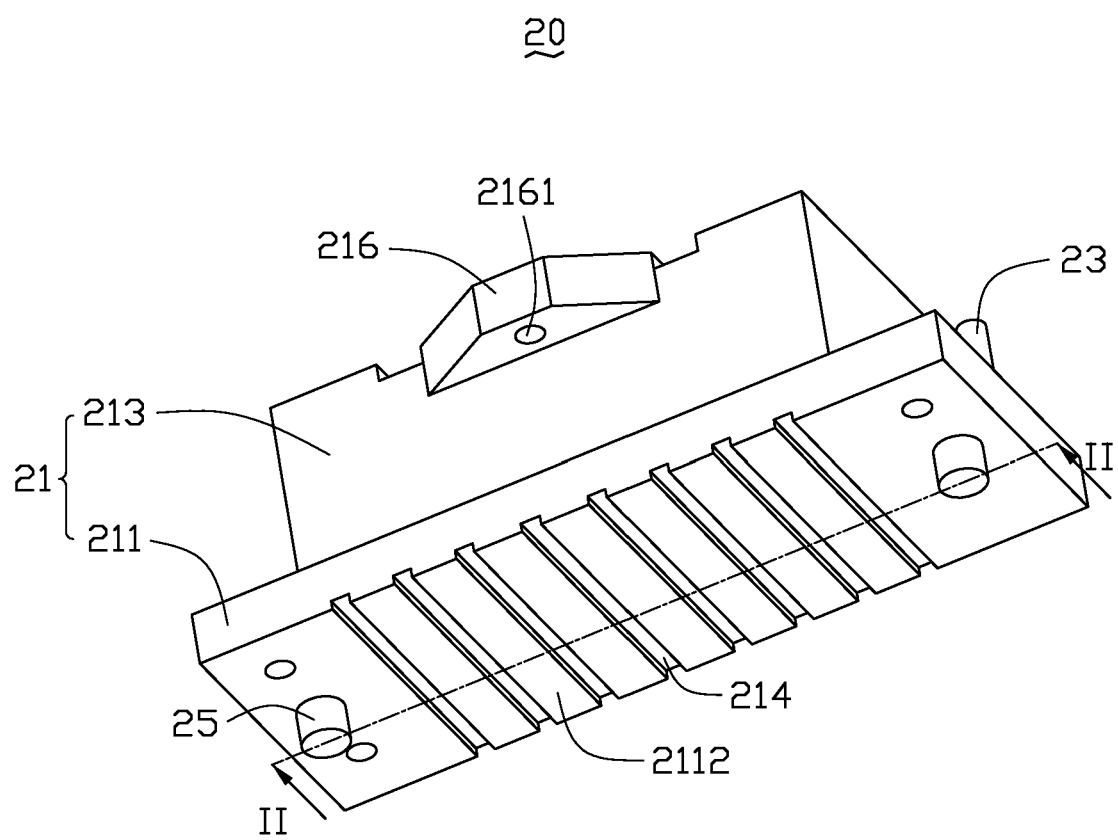
FIG. 1 is an isometric view of a magnetic clamp holder in accordance with a first embodiment of the present invention.
Figure 2:
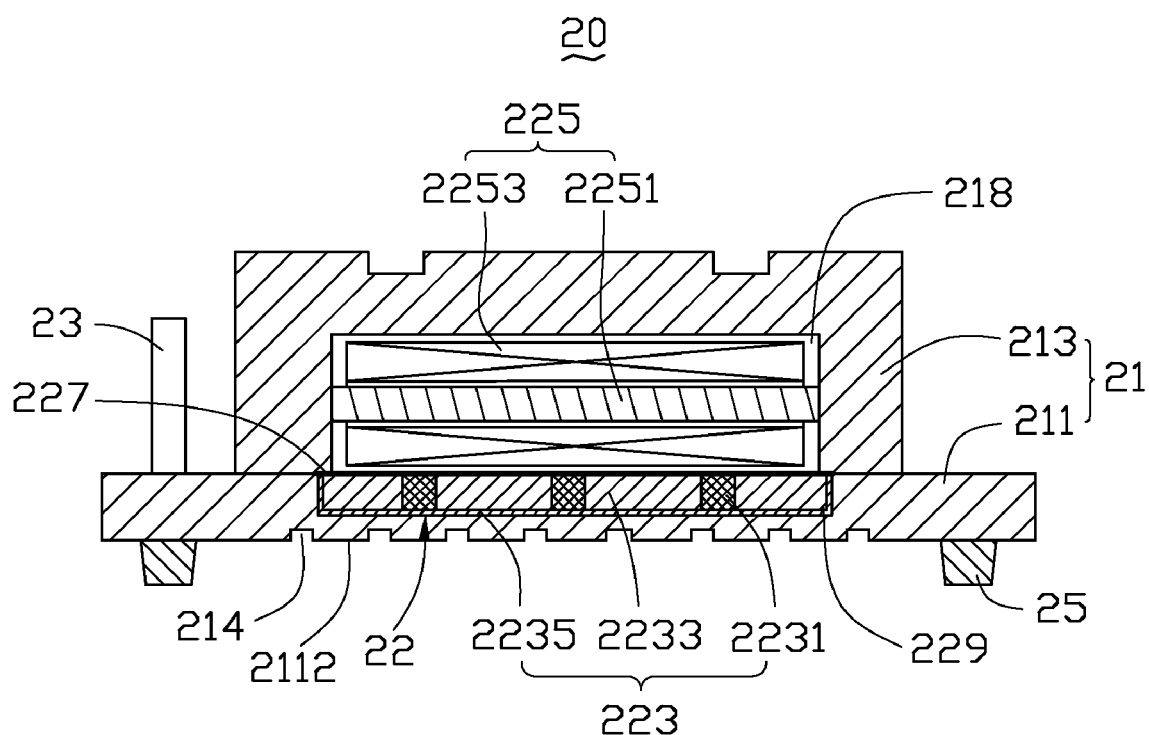
FIG. 2 is a cross-sectional view of the magnetic clamp holder of FIG. 1, taken along the line II-II thereof.

Referring to FIGS. 1 and 2, a magnetic clamp holder 20 in accordance with a first embodiment is shown. The magnetic clamp holder 20 is used in a mechanical arm (not shown) to magnetically attach a clamping device (not shown) for receiving one or more workpieces (not shown). The clamping device is made of ferrous materials or any other materials that are magnetic. The magnetic clamp holder 20 includes a housing 21, a magnetic structure 22, a sensor 23, and two positioning pins 25. The magnetic structure 22 is received in the housing 21. The sensor 23 and the positioning pins 25 are disposed on the housing 21.

The housing 21 is substantially an inverted T-shaped structure. The housing 21 includes an attaching portion 211, and a joining portion 213 fixed to the attaching portion 211. The attaching portion 211 includes a bottom surface 2112. The bottom surface 2112 defines a plurality of guiding grooves 214 for engaging with the clamping device. The guiding grooves 214 are aligned parallel to each other. The joining portion 213 includes two extending blocks 216 extending outward from opposite sides of the joining portion 213 adjacent a top surface of the joining portion 213. Each of the extending blocks 216 defines a through hole 2161. The extending blocks 216 are configured for fastening the magnetic clamp holder 20 to an end of a mechanical arm. The attaching portion 211 and the joining portion 213 cooperatively define a receiving cavity 218 for receiving the magnetic structure 22.

The magnetic structure 22 includes a permanent magnetic module 223, an electro-magnetic module 225, and a magnetic shield plate 227. The permanent magnetic module 223 is received in the receiving cavity 218 adjoining the attaching portion 211. The permanent magnetic module 223 includes a plurality of magnets 2231, a plurality of magnetic guiding plates 2233, and a copper plate 2235. The copper plate 2235 is used for shielding magnetic field. The magnets 2231 are preferred to be Nd—Fe—B (neodymium-ferrum-boron) sintered magnets. The copper plate 2235 defines a rectangular groove 229. The magnets 2231 and the magnetic guiding plates 2233 are aligned and arranged in an alternating manner in the rectangular groove 229 for creating magnetic fields. In the illustrated embodiment, the magnetic fields are able to create a magnetic force to attract and hold the clamping device. The magnetic force should be large enough to support a weight of the clamping device plus the workpieces if any. The electro-magnetic module 225 includes a ferrite core 2251 and a field coil 2253 surrounding the ferrite core 2251. The ferrite core 2251 lies parallel to the permanent magnetic module 223. The magnetic shield plate 227 is disposed between the permanent magnetic module 223 and the electro-magnetic module 225. A magnetic field created by the electro-magnetic module 225 is able to pass through the magnetic shield plate 227, however, the magnetic field created by the permanent magnetic module 223 is blocked by the magnetic shield plate 227. In alternative embodiments, the permanent magnetic module 223 and the electro-magnetic module 225 are both disposed in the attaching portion 211 of the housing 21, or both disposed in the joining portion 213 of the housing 21.

The sensor 23 is disposed on an outer surface of the attaching portion 211 of the housing 21. The sensor 23 is cylindrical and extends parallel to a side surface of the joining portion 213 of the housing 21. The sensor 23 is configured to control a movement of the magnetic clamp holder 20 by detecting whether the clamping device has been firmly held/attached by the magnetic clamp holder 20 or not. If the clamping device is firmly held with the magnetic clamp holder 20, the magnetic clamp holder 20 is allowed to move, otherwise, the magnetic clamp holder 20 is not allowed to move.

The positioning pins 25 are disposed at two opposite ends of the bottom surface 2112 of the attaching portion 211 of the housing 21. Each of the positioning pins 25 is a conical frustum. The positioning pins 25 are configured for engaging in two positioning holes of the clamping device so that the clamping device is held by the magnetic clamp holder 20 at a precise/accurate position relative to the magnetic clamp holder 20. The positioning pins 25 are not objects for clamping, but for alignment and thus the positioning pins 25 are not subjected to excessive abrasion. The magnetic clamp holder 20 has a positioning precision in the range of ±0.03 mm. It can be understood that the positioning pins 25 can be replaced by positioning holes, and accordingly the positioning pins are disposed on the clamping device.

Figure 3:
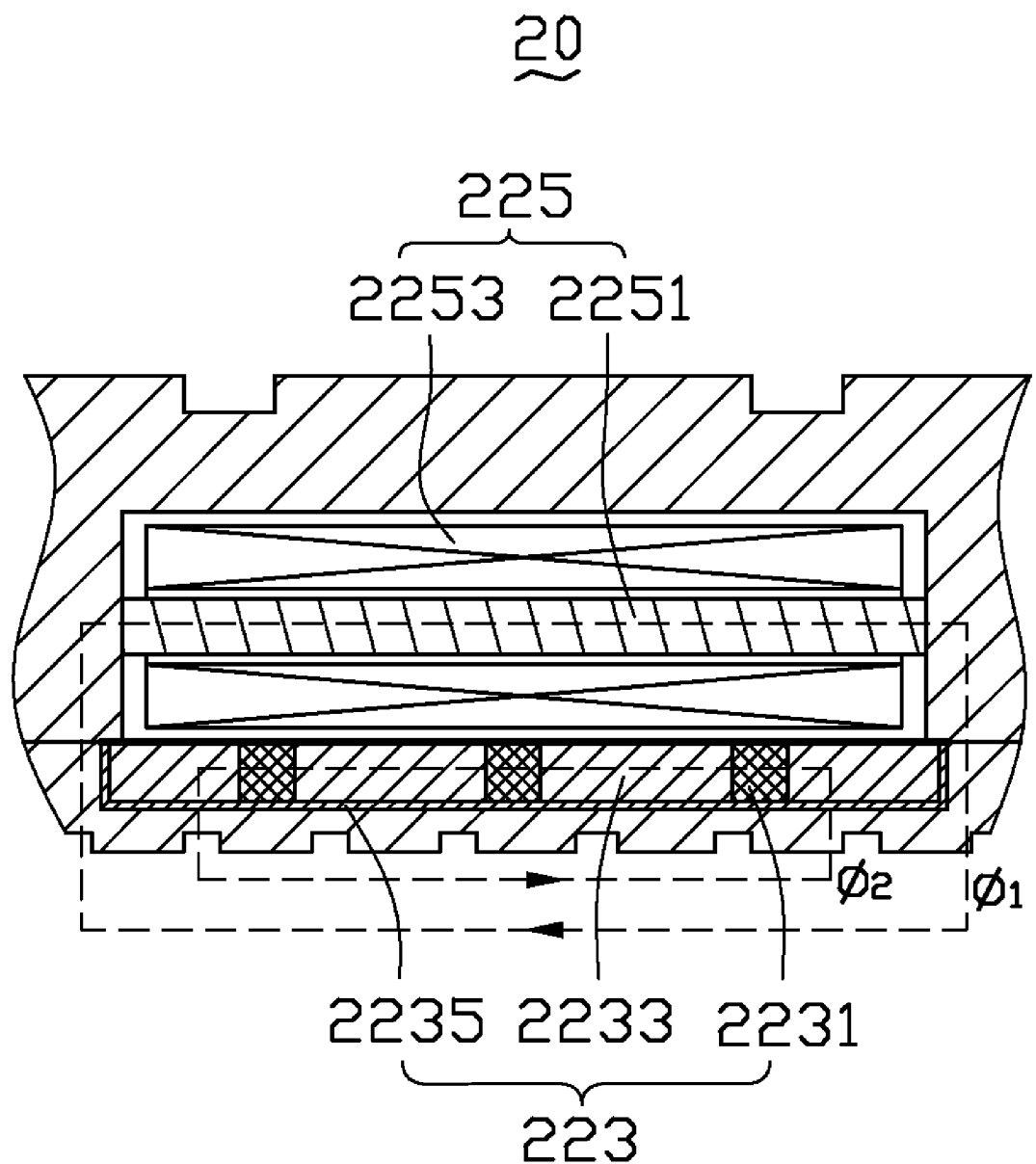
FIG. 3 is partially, cross-sectional view of the magnetic clamp holder of FIG. 1, but showing a magnetic field.

The magnetic clamp holder 20 has two work states: a non-magnetic state and a magnetic state. Referring to FIG. 3, when the magnetic clamp holder 20 is in a non-magnetic state, the field coil 2253 is energized. The direction of the current through the field coil 2253, of the electro-magnetic module 225, is such that the magnetic field $\phi_1$ is in a direction opposite to the direction of the magnetic field $\phi_2$ and the magnitude of this current is adjusted until the magnetic field $\phi_1$, generated by the electro-magnetic module 225, magnetic field equals the magnetic field $\phi_2$ of the magnetic module 223. Thus the magnetic field $\phi_1$ of the electro-magnetic module 225 neutralizes the magnetic field $\phi_2$, that is, $\Sigma\phi=\phi_1-\phi_2=0$. When the magnetic clamp holder 20 is in a magnetic state, the field coil 2253 is not energized, thus the electro-magnetic module 225 does not create magnetic field. However, the magnetic field $\phi_2$ of the magnetic module 223 still exists, thus the magnetic clamp holder 20 magnetized.

In a magnetic state, the magnetic clamp holder 20 can hold the clamping device. When the clamping device is to be detached from the magnetic clamp holder 20, a stated of the magnetic clamp holder 20 is changed to a nonmagnetic state by the electro-magnetic module 225. A response time for energizing the field coil 2253 by the current is very short, thus it is convenient for the magnetic clamp holder 20 to change from the magnetic state into the nonmagnetic state. If the exciting current for energizing the electro-magnetic module 225 is cut off intentionally or accidentally, the stated of the magnetic clamp holder 20 is immediately changed to the magnetic state, thereby preventing the clamping device from falling off the magnetic clamp holder 20. Since, the magnetic clamp holder 20 magnetically attaches the clamping device by the magnetic force of the magnetic structure 22, the magnetic clamp holder 20 is able to limit abrasions. In the illustrated embodiment, a response time of the electro-magnetic module 225 is less than 0.3 second.

Generally, if the electro-magnetic module 225 is energized for a long time, a lot of heat will be created due to a resistance of the field coil 2253. However, in the illustrated embodiment, the response time of the electro-magnetic module 225 is less than 0.3 seconds, thus heat generated by the electro-magnetic module 225 is kept to a minimum.

Figure 4:
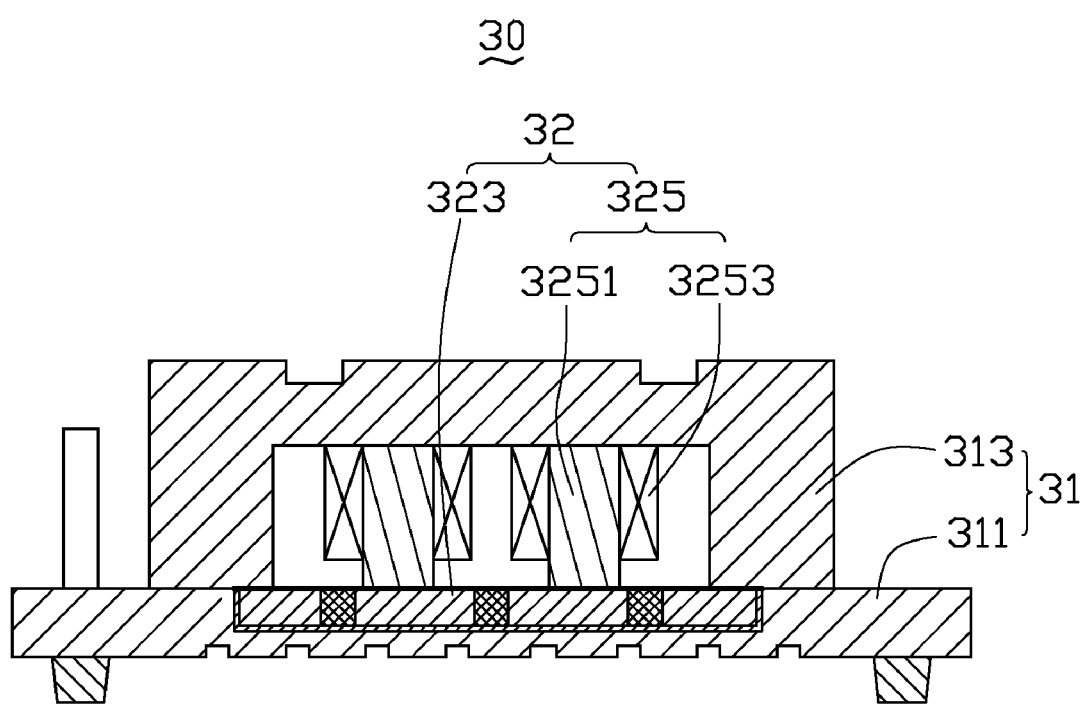
FIG. 4 is a cross-sectional view of a magnetic clamp holder in accordance with a second embodiment of the present invention.

Referring to FIG. 4, a magnetic clamp holder 30 according to a second embodiment is shown. The magnetic clamp holder 30 is similar in principle to the magnetic clamp holder 20 in the first embodiment. The magnetic clamp holder 30 includes a housing 31 and a magnetic structure 32. The magnetic structure includes a permanent magnetic module 323 and an electro-magnetic module 325. However, the electro-magnetic module 325 includes two ferrite cores 3251 and two field coils 3253. Each of the field coils 3253 surrounds the one of the ferrite cores 2251. The ferrite cores 3251 are parallel to each other and perpendicular to the permanent magnetic module 323.

Figure 5:
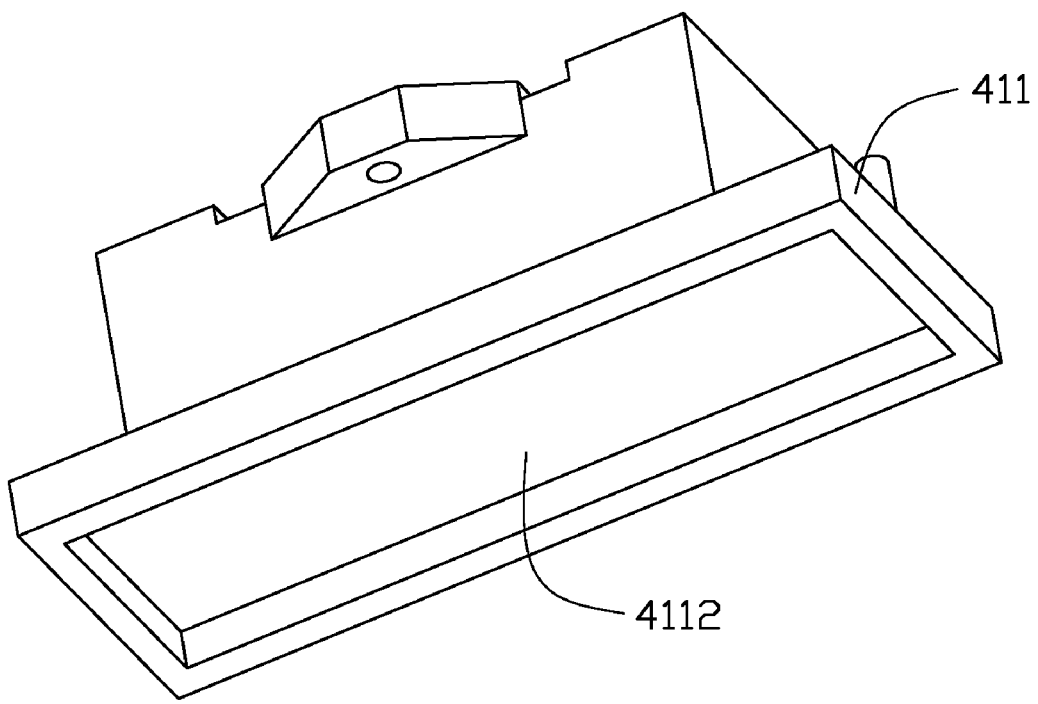
FIG. 5 is an isometric view of a magnetic clamp holder in accordance with a third embodiment of the present invention.
Figure 6:
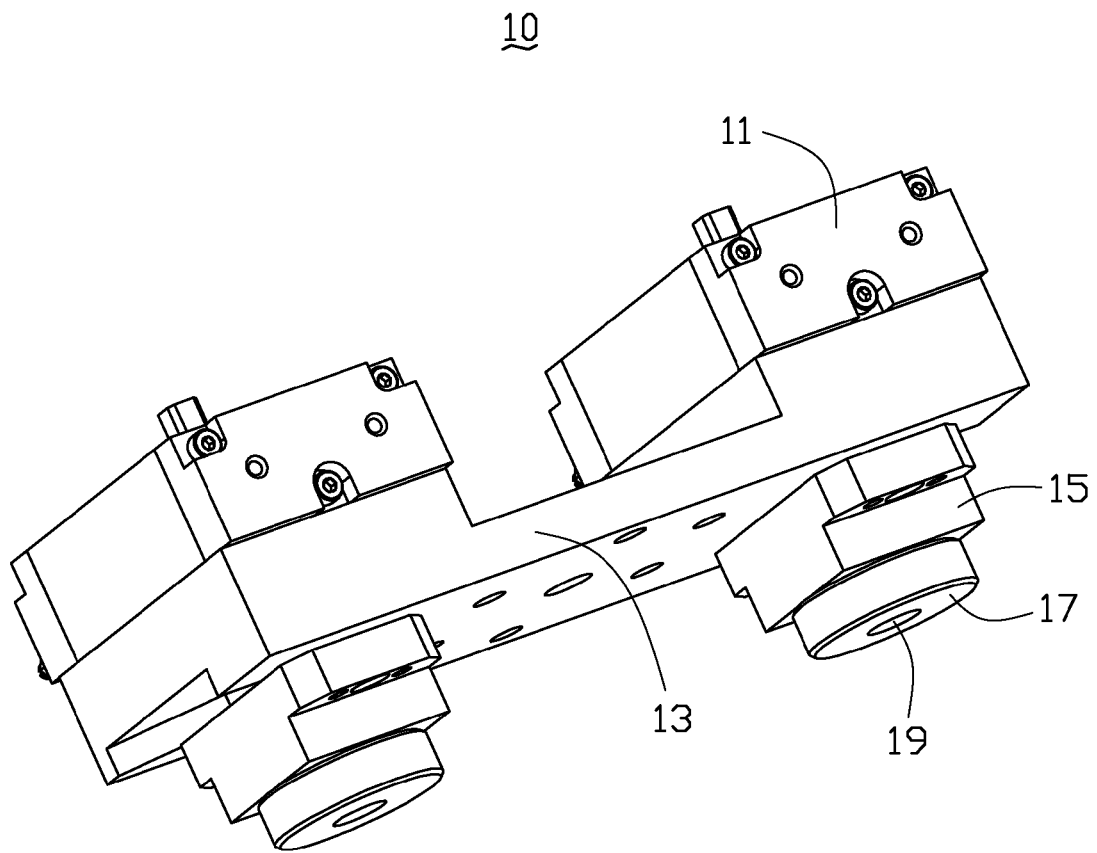
FIG. 6 is an isometric view of a conventional magnetic clamp holder.

Referring to FIG. 5, a magnetic clamp holder 40 according to a third embodiment is shown. The magnetic clamp holder 40 is similar in principle to the magnetic clamp holder 20 in the first embodiment. However, an attaching portion 411 of the magnetic clamp holder 40 defines a rectangular guiding groove 4112. The rectangular guiding groove 4112 is configured for engaging with the clamping device.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A magnetic clamp holder used for a mechanical arm, comprising:
   a housing including an attaching portion, and a joining portion fixed to the attaching portion, the attaching portion and the joining portion cooperatively defining a receiving cavity;
   a magnetic structure received in the receiving cavity, the magnetic structure including a permanent magnetic module, an electro-magnetic module, and a magnetic shield plate disposed between the permanent magnetic module and the electro-magnetic module, and the electro-magnetic module being able to create a magnetic field for neutralizing a magnetic field of the permanent magnetic module; and
   two positioning pins disposed on the attaching portion of the housing.

2. The magnetic clamp holder as claimed in claim 1, wherein the permanent magnetic module includes a plurality of magnets, and a plurality of magnetic guiding plates, and a copper plate, the copper plate defines a rectangular groove, the magnets and the magnetic guiding plates are aligned and arranged in an alternating manner in the rectangular groove for creating the magnetic field.

3. The magnetic clamp holder as claimed in claim 2, wherein the magnets are neodymium-ferrum-boron sintered magnets.

4. The magnetic clamp holder as claimed in claim 1, wherein the electro-magnetic module comprises a ferrite core and a field coil surrounding the ferrite core.

5. The magnetic clamp holder as claimed in claim 4, wherein the ferrite core is parallel to permanent magnetic module.

6. The magnetic clamp holder as claimed in claim 1, wherein the electro-magnetic module comprises two ferrite cores and two field coils, each of the field coils surrounds one of the ferrite cores.

7. The magnetic clamp holder as claimed in claim 1, wherein the permanent magnetic module is disposed in the attaching portion of the housing, and the electro-magnetic module is disposed in the joining portion of the housing.

8. The magnetic clamp holder as claimed in claim 1, further comprising a sensor disposed on the attaching portion of the housing.

9. The magnetic clamp holder as claimed in claim 8, wherein the sensor is cylindrical and is parallel to a side surface of the joining portion of the housing.

10. The magnetic clamp holder as claimed in claim 1, wherein the attaching portion comprises a bottom surface and the bottom surface defines a plurality of parallel guiding grooves therein.

11. The magnetic clamp holder as claimed in claim 10, wherein the positioning pins are disposed at the bottom surface of the attaching portion of the housing.

* * * * *